(12) United States Patent
Fautz et al.

(10) Patent No.: US 9,573,233 B2
(45) Date of Patent: Feb. 21, 2017

(54) DEVICE FOR KEYWAY BROACHING

(71) Applicant: WTO Werkzeug-Einrichtungen GmbH, Ohlsbach (DE)

(72) Inventors: Tobias Fautz, Zell am Harmersbach (DE); Thomas Kreutzer, Grafenhausen (DE); Karlheinz Jansen, Schutterwald (DE)

(73) Assignee: WTO Werkzeug-Einrichtungen GmbH, Ohlsbach (DE)

( * ) Notice: Subject to any disclaimer, the term of this patent is extended or adjusted under 35 U.S.C. 154(b) by 252 days.

(21) Appl. No.: 14/487,610

(22) Filed: Sep. 16, 2014

(65) Prior Publication Data

US 2015/0132077 A1    May 14, 2015

(30) Foreign Application Priority Data

Sep. 16, 2013  (DE) .................. 10 2013 218 507

(51) Int. Cl.
*B23D 13/02*     (2006.01)
*B23Q 5/027*     (2006.01)
(Continued)

(52) U.S. Cl.
CPC ................. *B23Q 5/027* (2013.01); *B23D 1/08* (2013.01); *B23D 3/02* (2013.01); *B23D 11/00* (2013.01);
(Continued)

(58) Field of Classification Search
CPC ............. B23D 41/08; B23D 1/08; B23D 1/16; B23D 1/20; B23D 1/28; B23D 3/02; B23D 3/04; B23D 5/00; B23D 7/10; B23D 13/02; B23D 11/00; Y10T 409/40665; Y10T 409/406825; Y10T 409/403675;Y10T 409/1028; Y10T 409/504756; Y10T 409/506232; Y10T 409/507544; Y10T 409/507872; Y10T 409/506888; Y10T 409/507052; Y10T 409/5082; B23Q 5/027

See application file for complete search history.

(56) References Cited

U.S. PATENT DOCUMENTS 2,109,356 A  *  2/1938  Larsen ..................... B23D 3/02
                                                    409/307
2,551,359 A  *  5/1951  Bannow .................. B23D 3/04
                                                    409/259
(Continued)

FOREIGN PATENT DOCUMENTS

DE   WO 2010017806 A1 *  2/2010  ............. B23D 1/08
DE        202014006383 U1 *  8/2014  ............ B23D 11/00
(Continued)

*Primary Examiner* — Daniel Howell
(74) *Attorney, Agent, or Firm* — Gudrun E. Huckett

(57) ABSTRACT

A device for keyway broaching is provided with a housing, a drive shaft, a broaching carriage received and supported in the housing, a tool support connected to the broaching carriage, and a crank drive that couples the drive shaft and the broaching carriage with each other. The broaching carriage, when driven by the drive shaft, performs an oscillating movement comprising a cutting movement and a return stroke. A sleeve is arranged between the housing and the broaching carriage. A first seal is provided between the housing and the sleeve and/or between the sleeve and the broaching carriage. The tool support is connected to the broaching carriage with a rocking lever interposed between the tool support and the broaching carriage. The drive shaft has a control section that controls a relative movement between the rocking lever and the broaching carriage.

52 Claims, 8 Drawing Sheets

(51) Int. Cl.
*B23D 1/08* (2006.01)
*B23D 11/00* (2006.01)
*B23D 3/02* (2006.01)
*B23D 41/08* (2006.01)

(52) U.S. Cl.
CPC ............... *B23D 13/02* (2013.01); *B23D 41/08* (2013.01); *Y10T 409/4028* (2015.01)

(56) References Cited

U.S. PATENT DOCUMENTS 3,881,398 A 5/1975 Gravagne
4,978,263 A * 12/1990 Sheppard ................ B23D 3/02
409/307

FOREIGN PATENT DOCUMENTS

| | | | |
|---|---|---|---|
| EP | 2 402 099 | 1/2012 | |
| EP | 2402099 A1 * | 1/2012 | ............ B23D 11/00 |
| JP | 59115112 A * | 7/1984 | |
| SU | 606 690 | 5/1978 | |

* cited by examiner

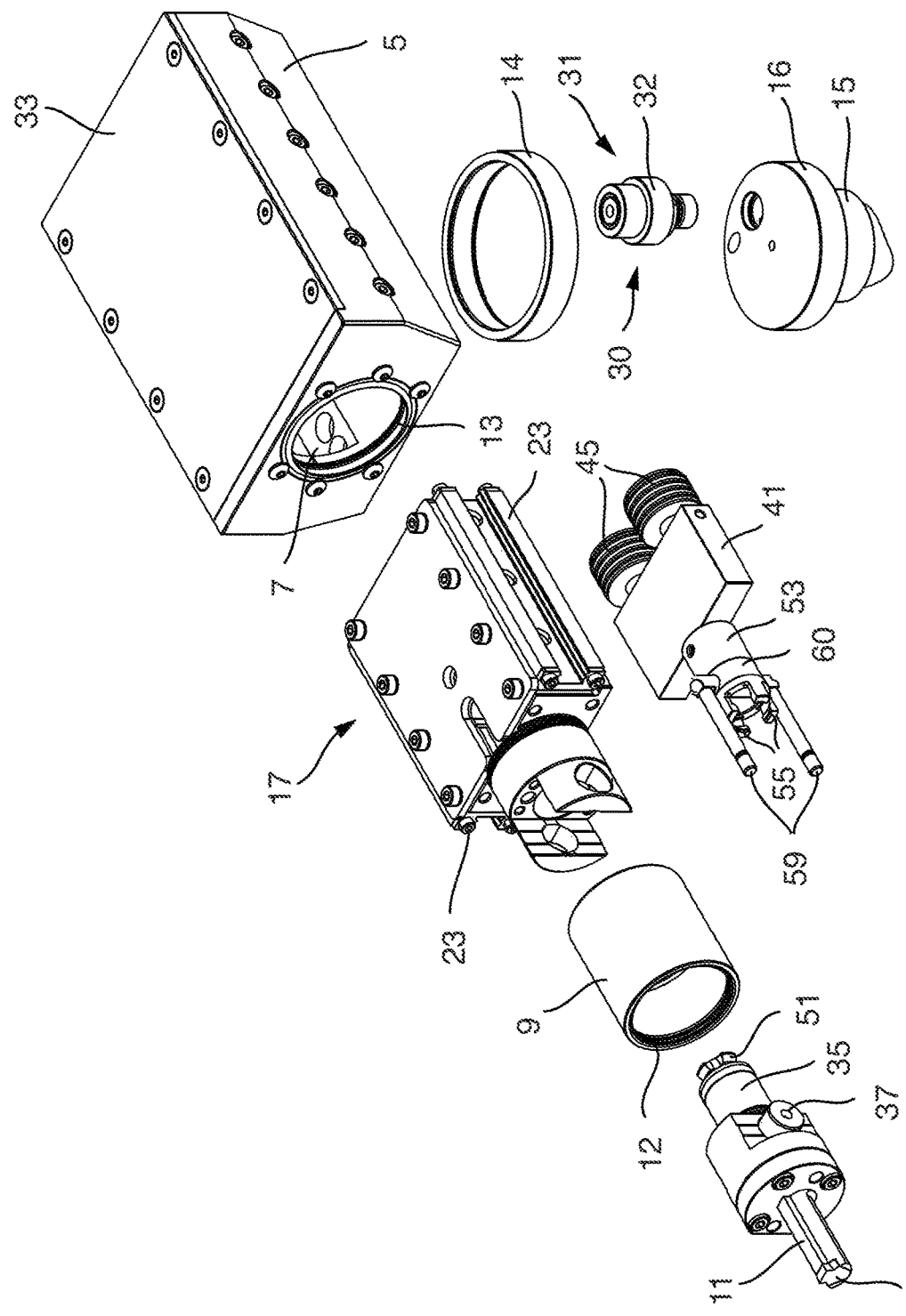
Fig. 1.1

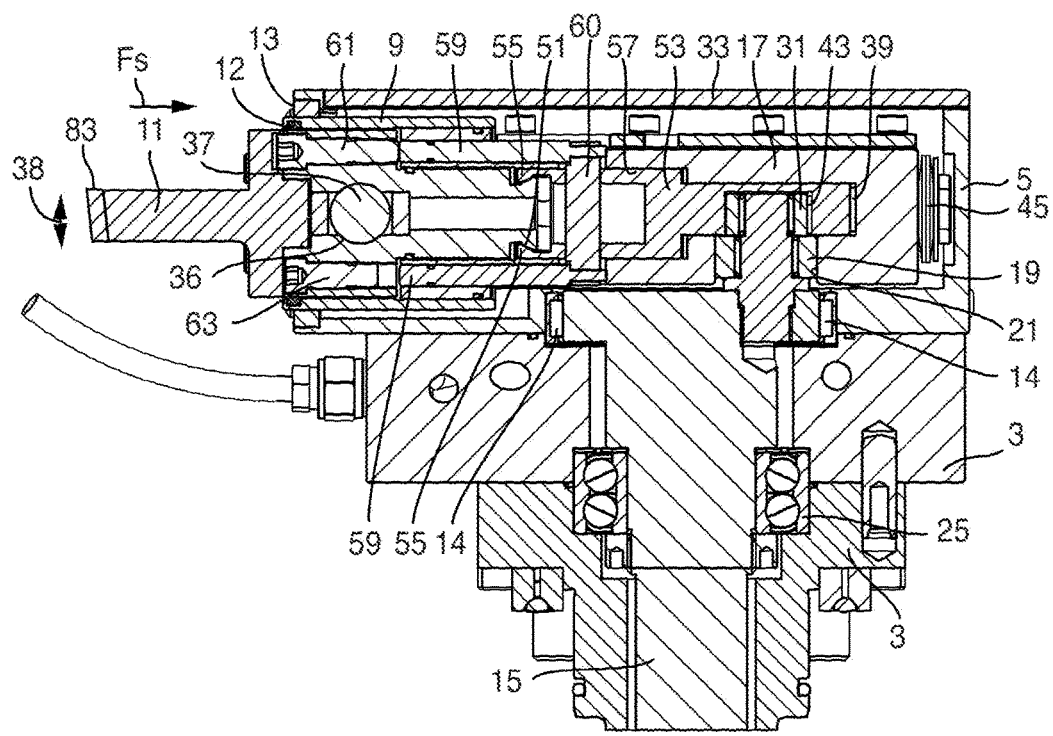
Fig. 1.2
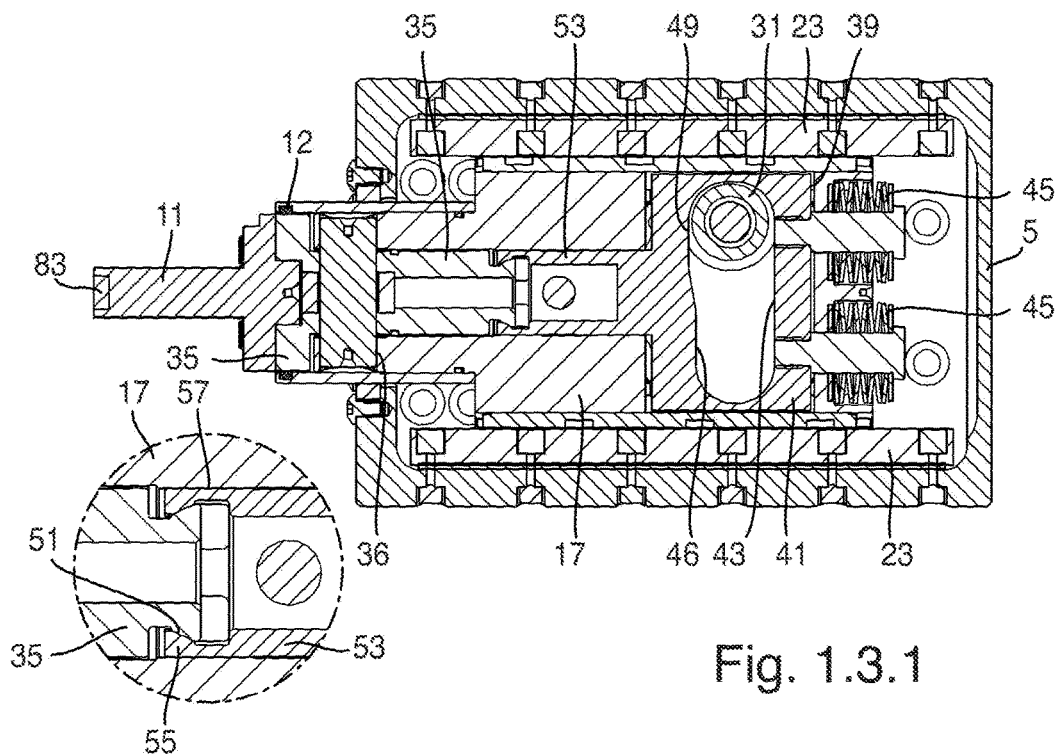
Fig. 1.3.1

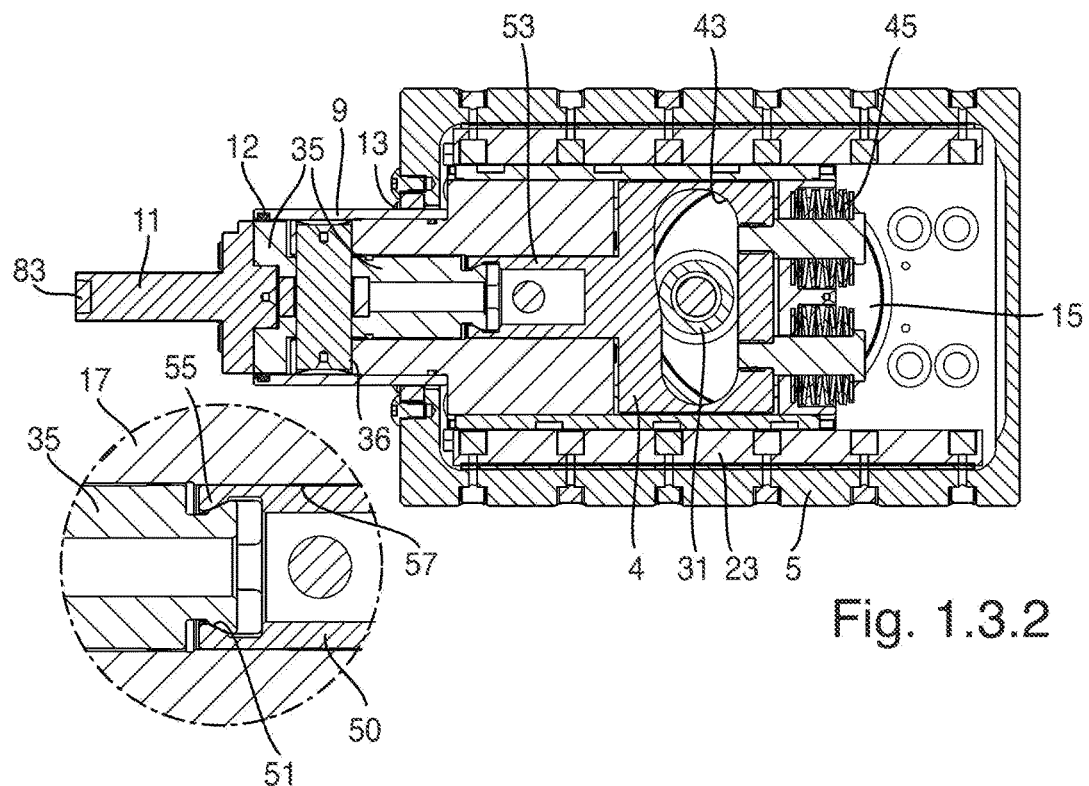
Fig. 1.3.2
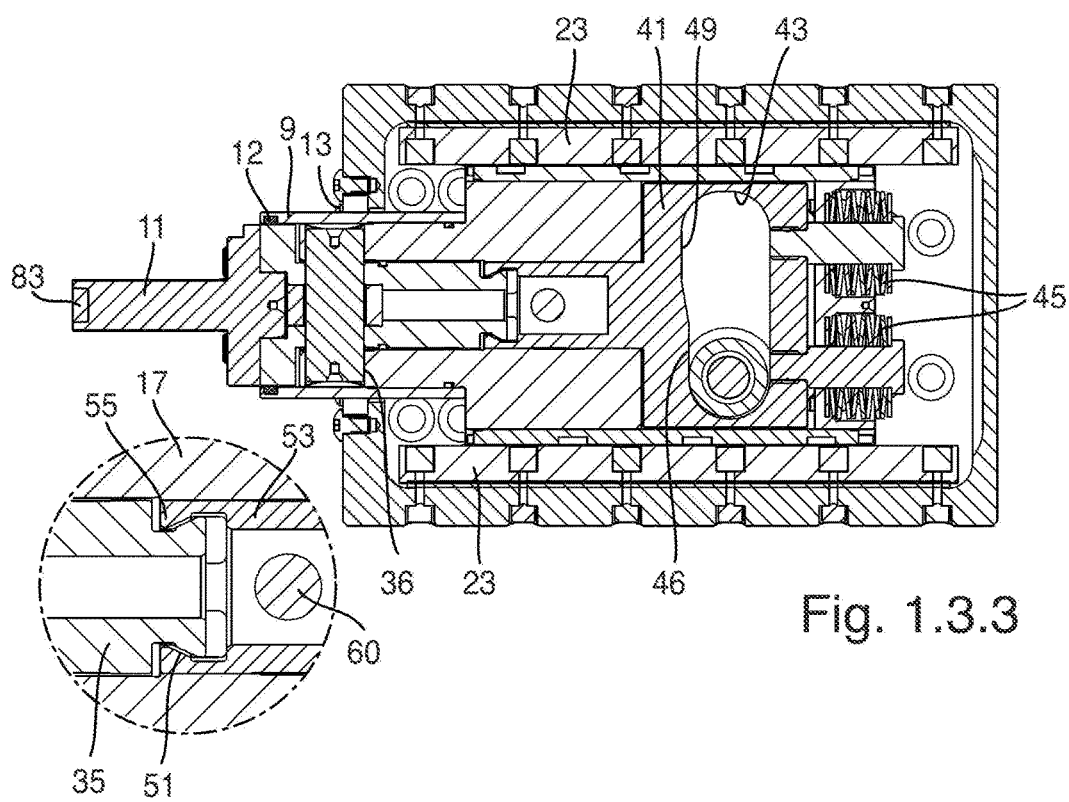
Fig. 1.3.3

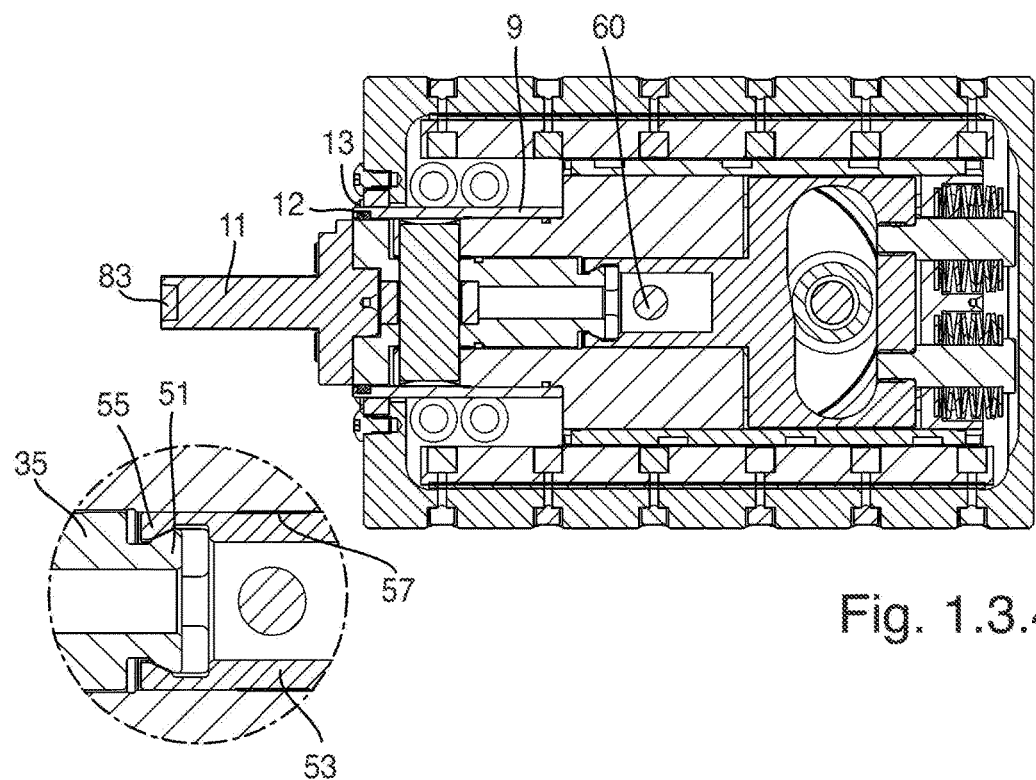
Fig. 1.3.4
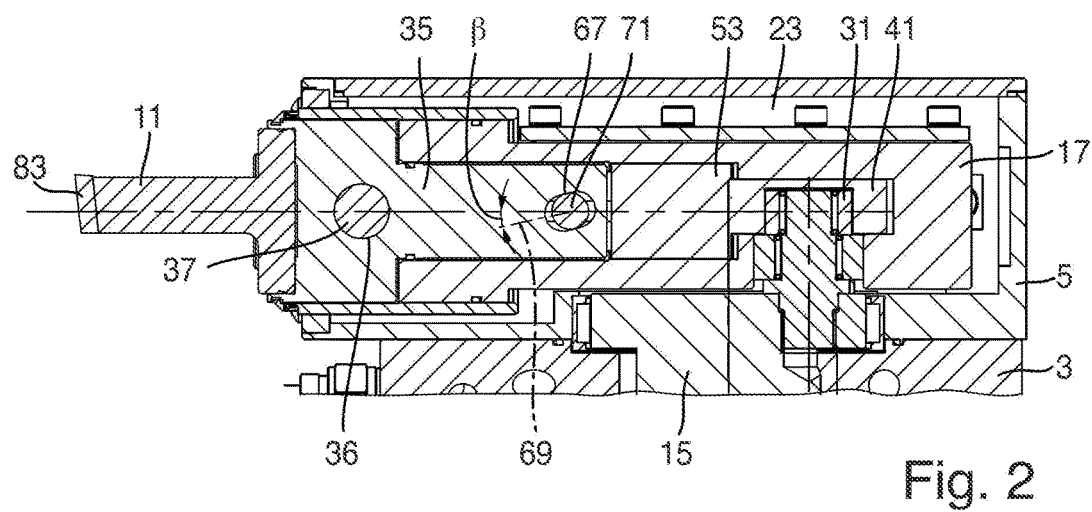
Fig. 2

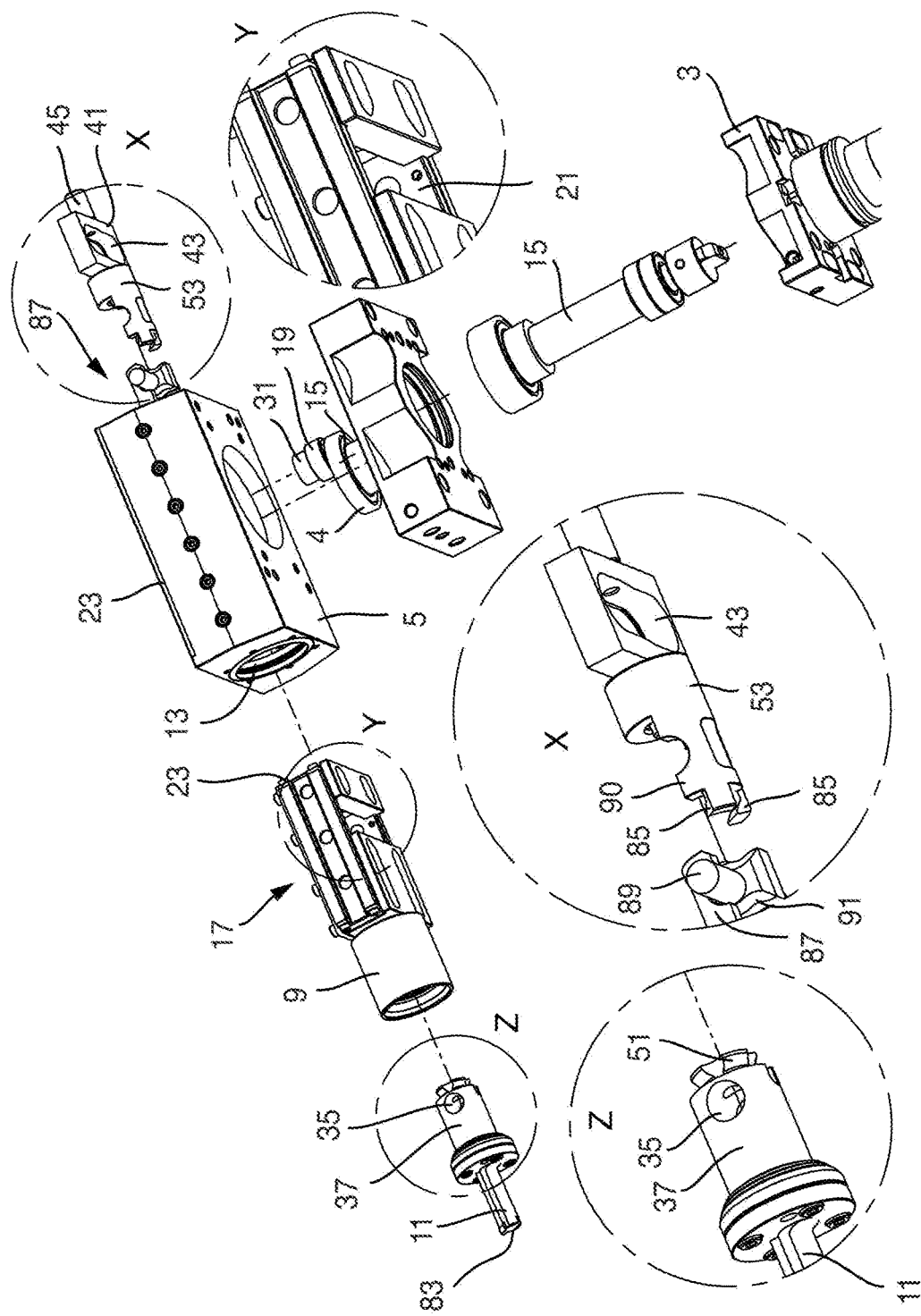
Fig. 4.1

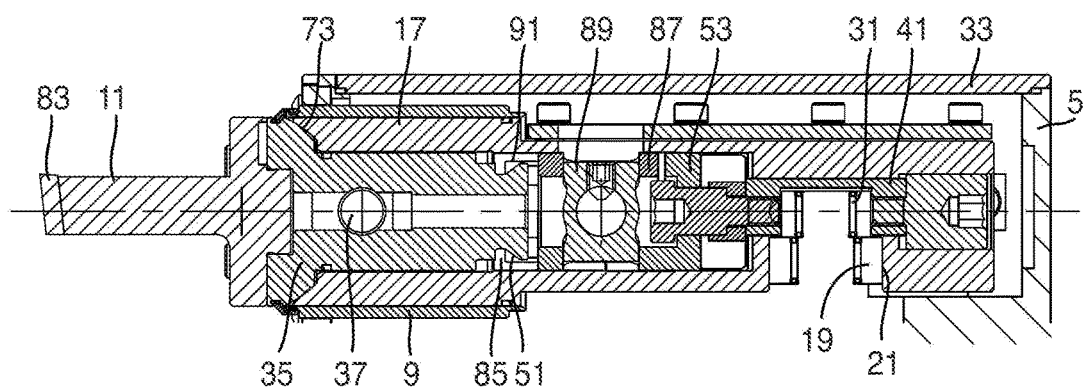
Fig. 4.2
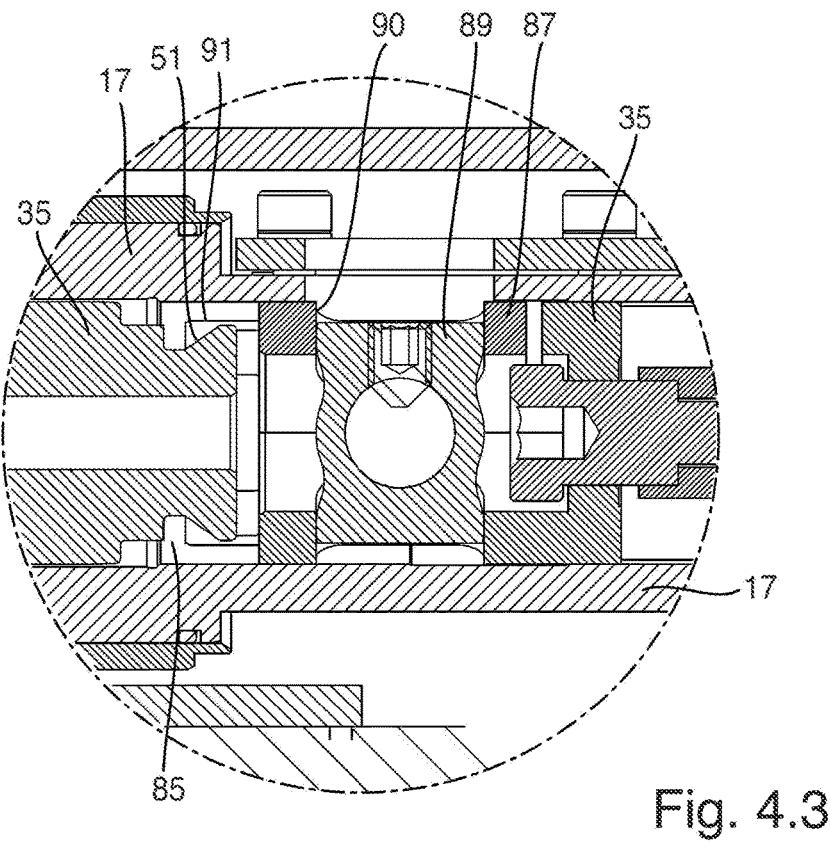
Fig. 4.3

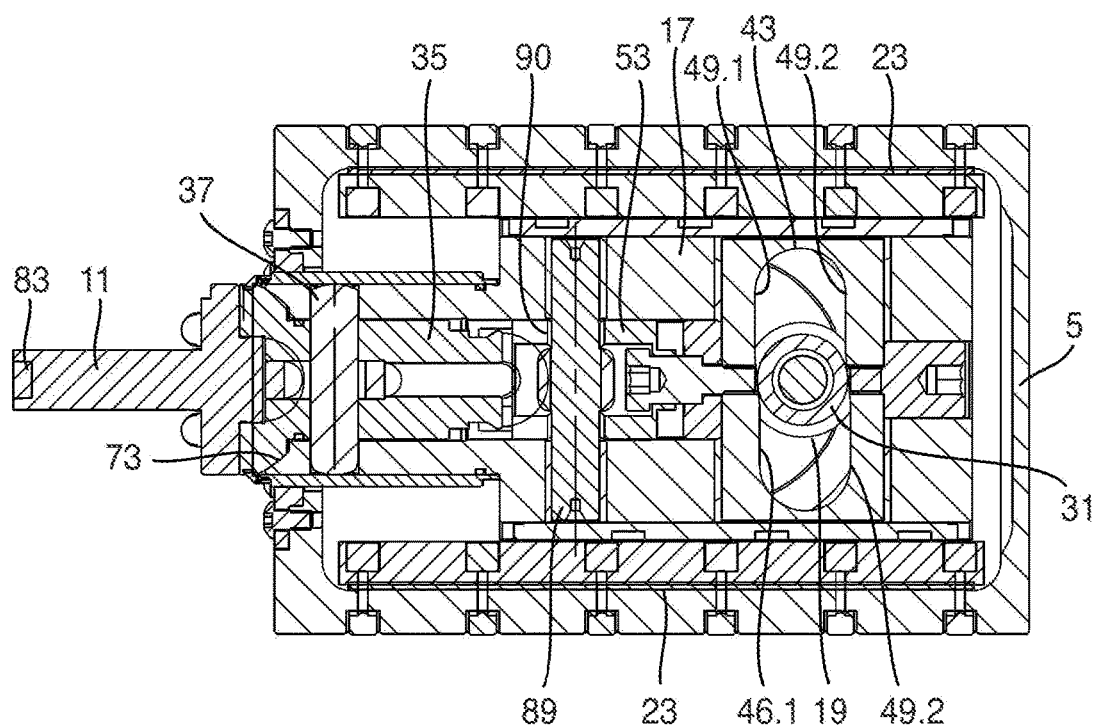
Fig. 4.4

DEVICE FOR KEYWAY BROACHING

BACKGROUND OF THE INVENTION

The invention relates to a driven device for keyway broaching, comprising a broaching carriage that is guided by one or several linear guides in a housing. The broaching carriage is driven by a gear assembly that converts a rotational movement of the drive shaft into a linear movement.

Devices for keyway broaching are disclosed, for example, in EP 2 402 099 A1 and in RU 606 690.

Keyway broaching is a method for producing keyways with a geometrically determined cutter. The chip removal is realized during the working stroke by the cutter of a broaching tool. The subsequent return stroke returns the broaching tool into its initial or starting position. In order to prevent that the cutter during the return stroke scrapes across the base of the keyway and thereby becomes blunt or even breaks off, the broaching tool during the return stroke must be somewhat lifted or tilted.

Simultaneous with the working and return stroke the feed (forward or advancing movement) is carried out until the desired keyway depth is reached. After having reached the keyway depth, several additional strokes are carried out without forward movement in order to reach a keyway parallel to the working stroke.

Because the cutting forces during broaching are relatively high, a stiff and robust clamping action and guiding action of the broaching tool are required. On the other hand, the same broaching tool, as mentioned above, must be lifted somewhat for the return stroke.

Since devices for keyway broaching are used in machine tools, it is advantageous when the lifting action of the tool during the return stroke can be carried out as needed in the direction of the positive X axis or in the direction of the negative X axis (see double arrow 38 in the Figures). It is then possible to machine workpieces with very large inner diameters as well as with very large outer diameters with the same device for keyway broaching in a machine tool, in this case a lathe.

The invention has the object to provide a robust, compact, and high-performance device for keyway broaching that enables a process-reliable manufacture of keyways in highest quality with minimal cycle times.

SUMMARY OF THE INVENTION

In accordance with the present invention, this object is solved with a device for keyway broaching, comprising a housing, a drive shaft, a broaching carriage, and a tool support, wherein the drive shaft and the broaching carriage are coupled with each other by a crank drive and the broaching carriage driven by the drive shaft carries out an oscillating movement, wherein the broaching carriage is received in the housing and supported by a linear guide, wherein between the housing and the broaching carriage a sleeve is arranged and wherein between the housing and the sleeve and/or the sleeve and the broaching carriage a seal is arranged.

This at least one seal makes it possible to seal the interior of the housing substantially hermetically relative to the environment, the housing containing the crank drive between drive shaft and broaching carriage as well as the mechanism for lifting the tool support or the cutting tool for the return stroke. In this way, neither the cooling lubricant nor the chips that are produced during machining can reach the interior of the device. Accordingly, a reliable and safe machining operation of the device is ensured.

It is alternatively also possible to connect the sleeve fixedly and seal-tightly with the broaching carriage so that in this case a moving seal is provided only between the housing and the sleeve. Since the tool support upon return stroke in radial direction must be somewhat moved so that the cutter is lifted off the base of the keyway, an additional seal is provided in the interior of the sleeve. This additional seal is a stationary seal which can compensate the aforementioned lifting stroke of the tool support. The concept according to the invention, wherein a sleeve that is arranged between the housing and the tool support and wherein the sealing task is "split" and provided by a moving seal and an additional stationary seal, is not only very reliable and provides for a long service life but also enables moreover to integrate, with the exception of the tool support, all components into the housing. Accordingly, the leverage and force conditions relative to conventional solutions are greatly improved which has a positive effect in regard to the cutting performance and the quality of machining. Also, the device according to the invention is of a very compact configuration, which is also an important advantage.

Accordingly, the installation space requirements and the number of components are reduced. The sleeve is only designed as a separate component in order to facilitate assembly of the components arranged within the broaching carriage or to even enable such installation. When this restriction is eliminated, the sleeve can also be a monolithic or unitary part of the broaching carriage.

Since, as already mentioned, the broaching tool must be somewhat lifted off the keyway base for the return stroke, the at least one seal is designed such that it allows for a relative movement between the housing and the sleeve and/or the sleeve and the broaching carriage in a direction that extends orthogonal to the oscillating stroke movement of the broaching carriage. Accordingly, in all positions of the broaching carriage or of the tool support, an effective sealing action of the housing interior relative to the environment is ensured and neither cooling lubricant nor chips can penetrate into the interior of the housing.

The aforementioned object is also solved by a device for keyway broaching, comprising a housing, a drive shaft, a broaching carriage, and a tool support, wherein the drive shaft and the broaching carriage are coupled with each other by a crank drive, wherein the broaching carriage is received in the housing and is guided in a linear guide, wherein the tool support is connected by means of a rocking lever indirectly with the broaching carriage and the drive shaft comprises a control section that controls a relative movement between the rocking lever and the broaching carriage.

Due to this kinematic coupling of the rocking lever and the broaching carriage, on the one hand, and the expansion of the function of the drive shaft, on the other hand, it is possible to provide a very compact and stiff device for keyway broaching. It should be noted that it is particularly advantageous that the drive shaft is provided with an additional function in that it is supplemented by a control section and this control section controls a relative movement between the rocking lever and the broaching carriage.

In this way, it is always ensured that the oscillating movement of the broaching carriage, that is realized, for example, by means of an eccentric member of the drive shaft, and the tilting of the rocking lever for the return stroke of the broaching carriage are fixedly coupled with each other so that a reliable and permanent function of the device is ensured.

In an advantageous embodiment of the invention, the control section is configured as an eccentric bolt and interacts with a sliding block. This embodiment is easily controllable with regard to manufacturing technology and is very robust.

Moreover, it has been found to be advantageous when in the broaching carriage a recess is formed and the sliding block is received in the recess and is slidably guided therein in the direction of the oscillating movement of the broaching carriage. In this way, it is possible to control a relative movement between the sliding block and the broaching carriage as a function of the angle of rotation of the position of the drive shaft.

In other words, during the cutting movement (working stroke of the tool support), the rocking lever is in a first angular position. During return stroke of the broaching carriage, the rocking lever assumes a second angular position. Due to this change, even though minimal, of the angular position of the rocking lever, the cutter, which is connected to the tool support, is lifted off the base of the previously broached keyway for the return stroke.

Because the drive of the broaching carriage as well as the control of the rocking lever are realized by one and the same drive shaft, this configuration is very compact, is very stiff, and has a high mechanical stability.

It is particularly advantageous when the drive of the broaching carriage and the control of the rocking lever are realized by means of a common component, for example, a pin with an eccentric member, and an eccentric section that adjoins it. This component can be connected to a disk which is formed on the drive shaft by being pressed in, screwed in or embodied monolithically therewith. In this way, a very compact and high-performance conversion of the rotational movement of the drive shaft into the oscillating movement of the broaching carriage and the control movement of the rocking lever can be realized.

It has been found to be advantageous when the sliding block is provided with a guide that is formed as a control curve and when the eccentric bolt displaces slidably by means of the guide a push and pull rod interacting with the rocking lever relative to the broaching carriage.

As an alternative, it is also possible to configure the control section of the drive shaft as a (non-round) cam and to provide in the sliding block only a simple slotted hole. In this way, it is also possible to control a relative movement between the sliding block and the broaching carriage or the push and pull rod.

This relative movement between the push and pull rod and the broaching carriage is the control movement by means of which the rocking lever is moved into the first angular position or into the second angular position. The conversion of this linear control movement into a small rotational movement of the rocking lever can be realized in various ways. Embodiments in this regard are illustrated in the attached Figures which will be explained in more detail infra.

It is alternatively possible that the eccentric bolt or the cam engages with minimal play (clearance) or with play (clearance) the guide. When the eccentric bolt of the cam engages with minimal play the guide, a forced control of the sliding block by the eccentric bolt is provided. When the eccentric bolt or the cam engage with play (clearance) the guide, it is advantageous when the sliding block is loaded by a spring force in order to ensure that the guide or a portion of the guide at the desired point in time of control action, or at a desired rotational angle of the drive shaft, remains at all times in contact with the eccentric bolt of the cam.

It should be noted that in some embodiments only a portion of the guide is utilized as a control curve while the remainder of the guide has no such function.

The drive of the broaching carriage or of the coupling between the drive shaft and the broaching carriage can be realized by means of a first eccentric member that is formed on the drive shaft and a slotted hole that is formed in the broaching carriage. Alternatively, it is also possible to convert the rotational movement of the drive shaft into an oscillating movement of the broaching carriage by means of a lifting pin on the drive shaft and a connecting rod.

A particularly advantageous embodiment of the invention provides that the rocking lever is received in a longitudinal bore of the broaching carriage. In this way, a very compact configuration results. Since the cutting forces are substantially introduced in the area of the longitudinal axis of the broaching carriage, the broaching carriage during machining will not deviate from proper alignment as a result of the cutting forces acting on it. Accordingly, the performance of the device according to the invention is improved and the surface quality and geometry of the keyways broached with the device according to the invention are improved.

In a further advantageous embodiment of the invention, it is provided that the sliding block is connected with a push and pull rod and that the push and pull rod controls the rocking lever from a first angular position into a second angular position and from the second angular position into the first angular position. In this connection, the control action of the rocking lever is realized as a function of the rotational position of the drive shaft. Because the broaching carriage is also driven by the drive shaft, the movements of the broaching carriage and of the rocking lever are therefore always synchronized.

As already mentioned, there are several possibilities of realizing this redirection or control action of the rocking lever from the first angular position into the second angular position and back. In a particularly advantageous embodiment of the invention, the rocking lever has at the end which is facing the push and pull rod a wedge-shaped or truncated cone-shaped rocking lever section. On the push and pull rod at the end which is facing the rocking lever, at least one finger is formed, wherein the at least one finger interacts with the wedge-shaped or truncated cone-shaped rocking lever section in such a way that, under a pulling load, it deviates or is deflected toward the exterior and is supported at the longitudinal bore of the broaching carriage.

This means that at the time when the broaching tool carries out to working stroke, the rocking lever with its rearward end is always supported radially at the longitudinal bore of the broaching carriage and, during the cutting movement, the rocking lever is therefore fixed in the first angular position. As a result of this, the cutter of the broaching tool is guided very precisely and stiffly.

It has been found to be advantageous when on the push and pull rod several fingers distributed about the circumference are provided and/or these fingers are bending-elastic. In this way, the fixation of the rocking lever during the working stroke is further improved.

In order to ensure that the rocking lever during the return stroke is rotated into the desired second angular position, at least one plunger is arranged on the push and pull rod approximately parallel to the movement direction of the broaching carriage. On the end of the broaching carriage which is facing away from the push and pull rod, at least one stop which is interacting with the plunger is provided.

When the sliding block at the beginning of the return stroke moves the push and pull rod relative to the broaching carriage in the direction of the rocking lever, the plunger impacts on the stop of the rocking lever and thereby moves the rocking lever from the first angular position (working stroke) into the second angular position (return stroke). The rocking lever, before the working stroke begins, is automatically returned into the first angular position when the push and pull rod, as a result of the control action of the sliding block, moves again somewhat away from the rocking lever so that the fingers of the pull rod engage about the rocking lever and secure it in the first angular position.

When two such plungers are provided, 180 degrees displaced relative to each other, it is possible, by exchanging the stop, to change the movement direction of the rocking lever for the transition from the first angular position into the second angular position.

Alternatively, it is also possible that the wedge-shaped or truncated cone-shaped section or shoulder of the rocking lever interacts with at least one pawl on the push and pull rod and that the pawl is interacting with the wedge-shaped shoulder in such a way that, for a pulling load of the push and pull rod, the end of the rocking lever that is facing the push and pull rod is pivoted orthogonally to the direction of the oscillating movement of the broaching carriage.

In this case, it is advantageous when, as a further supplement, a reversing element with at least one further pawl is rotatably supported on the push and pull rod, when the at least one pawl of the reversing element is arranged opposite to the pawl or pawls of the push and pull rod, and when the at least one pawl of the reversing element engages the wedge-shaped shoulder or section of the rocking lever.

By means of this reversing element, a forced guiding action of the rocking lever is realized that makes it possible to bring the rocking lever into contact with the longitudinal bore of the broaching carriage opposite the pawls of the push and pull rod (first angular position). The rocking lever assumes this first angular position during the working stroke.

When the push and pull rod is moved relative to the rocking lever in axial direction, the pawls of the reversing element then move the rocking lever against the opposite side of the longitudinal bore which is then the final stop for the second angular position of the rocking lever.

This device is very stiff and mechanically very stable (load-resistant). In order to compensate play (clearance) in radial direction and wear, one or several spring elements can be provided.

As an alternative, it is also possible that the rocking lever at an end which is facing the push and pull rod is provided with a slotted hole that has a longitudinal axis which is positioned relative to the direction of the oscillating movement of the rocking lever at an angle that is greater than 0 degrees and that, on the push and pull rod, a transverse bolt is arranged that engages the slotted hole.

Due to this angle β between the longitudinal axis of the slotted hole and the oscillating movement of the rocking lever, it is possible, by movement of the transverse bolt in the slotted hole, to move the rocking lever back and forth between the first angular position and the second angular position.

This function is further improved when the rocking lever at the end which is facing away from the push and pull rod is provided with a transverse bore and on the broaching carriage a bolt is arranged which engages this transverse bore. In this way, a support of the rocking lever on the end which is facing the tool support is essentially realized.

Alternatively, it is also possible to provide at an end of the rocking lever which is facing away from the push and pull rod a slotted hole whose longitudinal axis is positioned relative to the direction of the oscillating movement of the rocking lever at an angle β that is greater than 0 degrees and to arrange a bolt on the broaching carriage which engages the slotted hole.

In this case, the rotational movement of the rocking lever between the first angular position and the second angular position is realized by a radial movement of the rocking lever on the end which is facing away from the push and pull rod. This is essentially a kinematic reversal of the afore described embodiment.

In order to realize as needed the change/switching of the movement direction upon lifting the tool off the keyway base, it is provided to embody the slotted hole in a separate component which is connectable in two positions with the rocking lever.

An alternative possibility of supporting the rocking lever in the broaching carriage resides in that on the broaching carriage, in the area of the end face opening of the housing, a spherical cup or a truncated cone structure is embodied and on the rocking lever a complementary counter surface is embodied.

Such a support, due to the large contact surface, is mechanically very stable (load-resistant) and has a particularly good centering action while enabling great cutting forces.

In order to ensure that the installed components in the interior of the housing can be accessed easily and, despite of this, do not become soiled, a cover is screwed onto the housing; after assembly of all components, the cover is screwed seal-tightly onto the housing.

Further advantages and advantageous embodiments of the invention can be taken from the following drawings, the description, and the claims. All advantages and features that are disclosed in the drawing, the description, and the claims can be important with regard to the invention individually as well as in any combination with each other.

BRIEF DESCRIPTION OF THE DRAWING

The attached Figures show in various views different embodiments of devices for keyway broaching in accordance with the invention.

FIGS. 1.1 to 1.3.4 concern a first embodiment.
FIG. 2 concerns a second embodiment.
FIGS. 4.1 to 4.4 concern a fourth embodiment.

Figure 3:
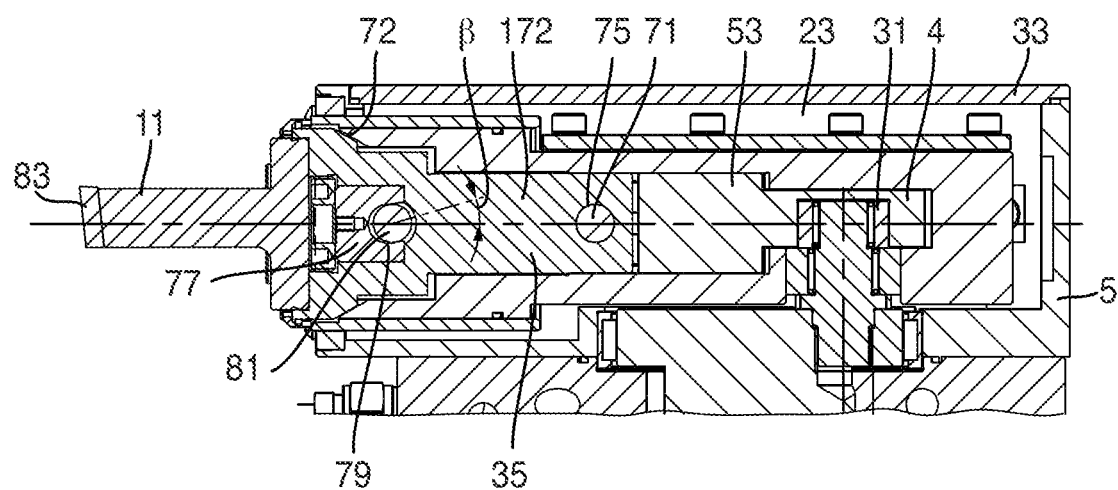
FIG. 3 concerns a third embodiment.

All figures are derived from manufacturing drawings. Therefore, geometric ratios are illustrated appropriate for functioning. Same components are provided with same reference characters and the respective disclosure provided in connection with one embodiment applies to the other embodiments. For reasons of simplifying the drawing, not all of the reference characters are always provided in all of the Figures.

DESCRIPTION OF THE PREFERRED EMBODIMENTS

FIG. 1.1 shows an exploded illustration of a device 1 according to the invention for keyway broaching.

The device 1 for keyway broaching comprises a base member 3, not illustrated in detail, that is configured such that it can be received in a machine tool.

A closed housing 5 is attached to the base member 3 and has an opening 7 visible at the end face in FIG. 1.1. In the assembled state, a sleeve 9 and a tool support 11 are projecting from this opening 7. In order to prevent that cooling lubricant or chips or other contaminants can penetrate into the interior of the housing 5, a seal 13 is provided between the sleeve 9 and the opening 7. The seal is a moving seal because it provides a sealing action between the stationary housing 5 and the oscillating sleeve 9.

At the left end of the sleeve 9 as shown in FIG. 1.1, an additional seal 12 is provided in the interior thereof. The additional seal 12 is a stationary seal because it effects a sealing action between the oscillating sleeve 9 and the rocking lever 35 that is also oscillating.

The sleeve 9 and the seals 12, 13 have also the important function of bridging the constructively required spacing (for enabling relative movement in radial direction) between the broaching carriage 17 and the rocking lever 35. This can be solved constructively in different ways.

Alternative a): The sleeve 9 is fixedly seated on one of the two parts (broaching carriage 17 or rocking lever 35) and between sleeve 9 and the other part (17 or 35) a further seal 12 is provided that compensates the relative movement.

In case of alternative a), two situations are to be differentiated.

When the sleeve 9 is seated on the rocking lever 35, then the sleeve 9 moves with the rocking lever 35 and the seal 13 must compensate the oscillating broaching stroke movement as well as the radial tilting movement. The seal 12 is seated in this case between the sleeve 9 and the broaching carriage 17. This seal must then compensate the radial tilting movement, transmitted by the rocking lever 35 onto the fixedly connected sleeve 9, between the sleeve 9 and the broaching carriage 17.

When the sleeve 9 is seated fixedly on the broaching carriage 17, the seal 13 must then seal only the broaching stroke movement relative to the housing. This situation is illustrated in FIGS. 1.2 and 1.3.1. The seal 12 is seated then between sleeve 9 and rocking lever 35 and must compensate the radial tilting movement at this location.

Alternative b): The sleeve is movable relative to both parts (broaching carriage 17 and rocking lever 35); a sealing action at both ends of the sleeve 9 must be provided and the seal 13 must seal the broaching stroke movement as well as the radial tilting movement.

At the bottom to the right in FIG. 1.1, a multi-bearing drive shaft 15 is shown which by means of an antifriction bearing 14 is supported in the housing 5.

A disk 16 which has several tasks is formed on the drive shaft 15. It receives a stepped bolt 30 that is arranged eccentric to the axis of rotation of the drive shaft 15. The eccentricity of the bolt 30 determines the stroke of the broaching carriage 17. The stepped bolt 30 can be pressed in, screwed in, or can be connected in other ways to the disk 16. The disk 16 is designed as a cylinder and can therefore serve as a bearing seat for the antifriction bearing 14. In this way, the support is very close to the point of attack of the forces on the bolt 30 and ensures, as a result of the short leverage between support and point of force introduction at the bolt 34, that only minimal deformations occur and thus a very high stiffness during the broaching process is present. This has the advantage that the broaching movements can be carried out without vibrations in the broaching direction. Because the disk 16 has a relatively large diameter, the antifriction bearing 14 can be sized correspondingly large and is therefore very load-resistant (mechanically stable) in order to absorb the forces of the broaching movement.

The stepped bolt 30 is inserted into the drive shaft 15. On the lower step of the bolt 30 in FIG. 1.1, an antifriction bearing 32 is seated. This step of the bolt 30 will be referred to in the following also as an eccentric member 19. It serves for driving the broaching carriage 17.

The upper part 31 of the bolt 30 in FIG. 1.1 can also be provided with an antifriction bearing and serves for controlling a sliding block 41. This upper part in the following is referred to as eccentric bolt 31 in order to simplify matters.

The eccentric member 19 engages a slotted hole 21 (see FIG. 1.2) of the broaching carriage 17 so that for each revolution of the drive shaft 15 the broaching carriage 17 carries out a cutting movement and a return stroke. FIG. 1.1 shows clearly two lateral linear guides 23 screwed onto the broaching carriage 17.

In FIG. 1.2 a longitudinal section of the device 1 according to the invention is illustrated. In this Figure it can be seen that the drive shaft 15 is also supported in the area of the base member 3 (see reference character 25). In the position of the drive shaft 15 illustrated in FIG. 1.2, the eccentricity of the eccentric member 19 and of the eccentric bolt 31 relative to the axis of rotation of the drive shaft 15 can be seen.

The eccentric member 19 engages in a slotted hole 21 of the broaching carriage 17 so that for each revolution of the drive shaft 15 the broaching carriage 17 carries out a working stroke and a return stroke.

The movement of the broaching carriage 17 in FIG. 1.2 from the right to the left is referred to as a working stroke. Accordingly, the broaching carriage 17 during return stroke moves in FIG. 1.2 from the left to the right.

In FIG. 1.2 it is also shown that the eccentric bolt 31 is engaged in a guide 43 of the sliding block 41. The eccentric bolt 31 and the guide 43 control lifting of the tool cutting edge at the end of the tool support 11 for the return stroke of the broaching carriage 17. The function of this control action will be explained in the following in detail.

At the upper end of the housing 5 in FIG. 1.2, a cover 33 is screwed seal-tightly onto the housing 5 so that the interior of the housing 5 is hermetically sealed relative to the environment.

In particular, cooling lubricant and chips cannot reach the interior of the device 1 or of the housing 5. The already mentioned sleeve 9 in connection with the seals 13 and 12 also partially contributes to this sealing action. The sleeve 9 follows the oscillating movement of the broaching carriage 17 during machining.

In the illustrated embodiment, the sleeve 9 is fixedly and seal tightly connected with the cylindrical section (see FIG. 1.1) of the broaching carriage 17 so that here, at the connection between sleeve 9 and broaching carriage 17, no moving seal is required. As needed, an O-ring seal between sleeve 9 and broaching carriage 17 can of course be provided as a stationary seal.

FIG. 1.2 illustrates the connection between sleeve 9 and broaching carriage 17 clearly.

FIGS. 1.1 and 1.2 show that the tool support 11 is not directly connected with the broaching carriage 17 but is screw-connected with a rocking lever 35.

The rocking lever 35 is pivotable or tiltable by means of a pin 37 in a transverse bore 36 of the broaching carriage 17. This pin 37 transmits the cutting forces which are introduced by the tool support 11 into the rocking lever 35 onto the broaching carriage 17. The direction of the cutting forces in FIG. 1.2 is indicated by the arrow Fs.

During the cutting process, the rocking lever 35 and together with it the tool support 11 assume a first angular position. During the return stroke, the rocking lever 35 and together with it the tool support 11 are moved by a small angle into a second angular position so that the cutting tool that is attached to the tool support 11 is lifted off the base of the keyway that has been previously broached.

This tilting movement of the rocking lever 35 and of the tool support 11 is indicated in FIG. 1.2 by double arrow 38. In this context, it should be noted that between the first and the second angular positions only a small angle is provided because it is sufficient when the cutter of the tool for the return stroke is lifted by approximately 0.5 mm to 0.3 mm off the base of the key way.

In the following, a first embodiment of a kinematic assembly according to the invention for realizing the tilting movement will be explained with the aid of the FIG. 1.2 as well as 1.3.1 to 1.3.4.

In order to facilitate understanding of the invention, it should be noted in this context that there are two relative movements.

The broaching carriage 17 moves relative to the housing 5 in an oscillating movement (cutting movement and return stroke).

The tool support 11, the rocking lever 35, the push and pull rod 53, and the sliding block 41 substantially follow or carry out this oscillating movement also. However, this main movement has superimposed thereon a control movement which in the following is often referred to as relative movement relative to the broaching carriage 17.

FIG. 1.2 shows that in the broaching carriage 17 a recess 39 is formed which receives the sliding block 41. The recess 39 and the sliding block 41 are located at the same height as the eccentric bolt 31 of the drive shaft 15. By interaction of the eccentric bolt 31 and sliding block 41, the inventive control action of the tilting movement of the rocking lever 35 is realized.

FIGS. 1.3.1-1.3.4 show that in the sliding block 41 a guide 43 is formed which together with the eccentric bolt 31 realizes the desired control function.

In the illustrated embodiment, the sliding block 41 is pulled by means of two laminated disk springs 45 in a direction away from the tool support 11. This means that only the left part of the guide 43 shown in FIGS. 1.3.1-1.3.4 is contacting the eccentric bolt 31. The right part of the guide 43 in FIGS. 1.3.1-1.3.4, as can be seen in the drawing, is not contacting the eccentric bolt 31 and is therefore without function.

This can be understood more easily when envisioning a revolution of the drive shaft 15. For this purpose, four characteristic positions of the drive shaft 15 are illustrated in FIGS. 1.3.1 to 1.3.4.

FIG. 1.3.1 shows the broaching carriage 17 extended half way in its working stroke.

FIG. 1.3.2 shows the broaching carriage 17 fully extended at the transition between working stroke and return stroke.

FIG. 1.3.3 shows the broaching carriage 17 half retracted.

FIG. 1.3.4 shows the broaching carriage 17 fully retracted at the transition between return stroke and working stroke.

In the position of the drive shaft 15 illustrated in FIG. 1.3.1 (working stroke), the eccentric bolt 31 is not resting on the section 49 of the guide 43. Therefore, the laminated disk springs 45 pull the sliding block 41 relative to the broaching carriage 17 to the right.

In the position of the drive shaft 15 illustrated in FIG. 1.3.2 (drive shaft 15 rotated approximately by 90° relative to FIG. 1.3.1), the eccentric bolt 31 is resting on the guide 43 and moves the sliding block 41 against the force of the laminated disk springs 45 relative to the broaching carriage 17 somewhat to the left.

The position of the drive shaft 15 illustrated in FIG. 1.3.3 (drive shaft 15 rotated approximately 180° relative to FIG. 1.3.1), the eccentric bolt 31 is positioned at the "raised" section 46 of the guide 43 and has moved the sliding block 41 still farther to the left relative to the broaching carriage 17. At the same time, the eccentric member 19 moves the broaching carriage 17 and together with it the sliding block 41 into the housing 5 (return stroke).

In the position of the drive shaft 15 illustrated in FIG. 1.3.4 (drive shaft 15 rotated approximately 270° relative to FIG. 1.3.1), the eccentric bolt 31 is positioned between the sections 46 and 49 in the guide 43 and allows movement of the sliding block 41 relative to the broaching carriage 17 somewhat to the right. At the same time, the eccentric member 19 has moved the broaching carriage 17 and together with it the sliding block 41 completely into the housing 5 (transition from the return stroke to the working stroke).

This relative movement of the sliding block 41 relative to the broaching carriage 17 is utilized in the device 1 according to the invention for keyway broaching in order to realize the desired tilting movement of the rocking lever 35 in various ways.

When looking in more detail at the locking lever 35 with the aid of FIG. 1.2, it is apparent that the rocking lever 35 at the right end in FIG. 1.2 has a wedge-shaped or truncated cone-shaped rocking lever section 51. Between the rocking lever 35 and the sliding block 41, a push and pull rod 53 is arranged which is connected to the sliding block 41. The sliding block 41 and the push and pull rod 53 can be manufactured as a monolithic part. On the end which is facing the rocking lever 35, the push and pull rod 53 has several fingers 55 that are bending-elastic and that are distributed about the circumference; the fingers 55 engage the wedge-shaped rocking lever section 51.

When the sliding block 41, as a result of the above-described control action of the eccentric bolt 31 on the sliding block 41, is moved to the right relative to the broaching carriage 17 in FIG. 1.2 (see also transition from FIG. 1.3.4 to FIG. 1.3.1), the fingers 55 of the push and pull rod 53 also move in FIG. 1.2 to the right. As a result of this, the bending-elastic fingers 55 are pushed radially outwardly by the truncated cone-shaped section 51 and are then positioned without play in the longitudinal bore 57 of the broaching carriage 17 (see enlarged detail in FIG. 1.3.1).

In this way, the rocking lever 35 is secured in a first angular position and the working stroke can be carried out.

When the working stroke has been performed, the sliding block 41 is moved by the eccentric bolt 31 relative to the broaching carriage 17 (as illustrated in FIG. 1.3.3) and, as a result of this movement, the fingers 55 move along the section 51 of the truncated cone shape and, in this way, enable radial play of the rocking lever 35 in the longitudinal bore 57 (see enlarged detail in FIG. 1.3.3).

In this way, it is possible that the rocking lever 35 performs a small rotational movement about the pin 37 that is sufficient in order to lift the tool support 11, or the cutter attached to the tool support 11, off the keyway base.

In principle, it is of course possible that the rocking lever 35 performs about the pin 37 a rotation in clockwise direction or in counterclockwise direction. In order for the rotational movement not to be random, on the push and pull rod 53 two plungers 59 are arranged which move together with the push and pull rod 53 relative to the rocking lever 35.

In the illustrated embodiment, the plungers 59 are connected by means of a pin 60 with the push and pull rod 53.

As soon as one of the two plungers 59 impacts on a stop 61 in the form of a stop screw, the rocking lever 35 is tilted in a defined way in the rotational direction predetermined by the stop (stop screw) and the tool support 11 also tilts together with the rocking lever 35.

The screw 63 is somewhat shorter than the screw 61 so that the lower plunger 59 in FIG. 1.2 is without any effect. The screw 63 is therefore no stop screw but only a closure screw.

In order to change the rotational direction with which the rocking lever 35 upon return stroke of the broaching carriage 17 is to be tilted, it is only necessary to change the stop 61 and the screw 63; this can be done within a few minutes.

A linear guiding action of the broaching carriage 17 in the housing 5 is indicated in FIG. 1.3 with reference number 23. In this context, commercial linear guides (rolling guides or sliding guides) can be used.

In the embodiment illustrated in FIGS. 1.2 and 1.3.1-1.3.4, the springs 45 have a further task. They not only have the task of forcing the sliding block 41 against the eccentric bolt 31 so that there is no play but also have the task of ensuring during the working stroke that also a permanent pull is exerted on the push and pull rod 53. With this permanent pulling load during the working stroke, on the one hand, due to the connection between the push and pull rod 53 and the rocking lever 35 as explained above in detail, the rocking lever 35 is clamped radially without play (clearance) in the bore 57 of the broaching carriage 17 and, on the other hand, also a pretension between rocking lever 35, pin 37, and broaching carriage 17 in the direction of the broaching force Fs is generated. With this pretension, the rocking lever 35 is pulled in the direction of the advancing force Fs against the pin 37. In this way, at the same time the pin 37 is also pulled toward the broaching carriage 17, i.e., is pulled into the transverse bore 36.

By a centering geometric configuration of the connecting point between the pin 37, the rocking lever 35 and/or the broaching carriage 17 or the transverse bore 36, it is ensured that at the joining location/contact location where the tilting movement occurs an exact pre-centering in +/−X direction is realized. During the actual broaching process, i.e., when the broaching force Fs is acting, this centering action by means of the broaching force Fs is also maintained against the occurring but significantly smaller transverse forces, or the centering action is even increased. With this concept, a precise play-free alignment of the tool cutter 83 in the X direction and a very stiff receiving action in the X direction and in the advancing direction and thus a very precise manufacture of the keyways and toothing is possible.

In FIGS. 2, 3, 4.1 to 4.4, further embodiments of a device 1 according to the invention for keyway broaching are shown in longitudinal section. Same components are identified with same reference characters and, in order to simplify matters, only the differences to the first embodiment according to FIGS. 1.1, 1.2, 1.3.1 to 1.3.4 will be explained in the following.

In the second embodiment in FIG. 2, on the rocking lever 35 on the end that is facing the push and pull rod 53 a slotted hole 67 is provided. The longitudinal axis 69 of the slotted hole 67 is positioned relative to the movement direction of the broaching carriage 17 at an angle β that is different from 0° and is, for example, 20°. In the slotted hole 67 a transverse bolt 71 is arranged that is connected fixedly with the push and pull rod 53. When the push and pull rod 53, that is connected with the sliding block 41 as already mentioned, carries out a relative movement relative to the broaching carriage 17 and thus also to the rocking lever 35, then the transverse bolt 71 moves back and forth within the slotted hole 67. Because the push and pull rod 53 is guided without play in the longitudinal bore 57 of the broaching carriage 17 and the rocking lever 35 is received with play in the longitudinal bore 57, the rocking lever 35 always performs a small rotary movement about the pin 37 when the sliding block 41 or the push and pull rod 53 moves relative to the broaching carriage 17. In this way, the rocking lever 35 moves between the first angular position and the second angular position. By reversing the rotary direction of the drive shaft 15, the first and the second angular position can be exchanged without modifications on the device (a change from interior machining to exterior machining).

In FIG. 3, a third embodiment of a device according to the invention for keyway broaching is illustrated. This third embodiment can be viewed essentially as a reversal of the second embodiment. In this case, the rocking lever 35 is received in a truncated cone structure 72 or a spherical cup of the broaching carriage 17. The transmission of the cutting and transverse forces from the tool carrier 11 via the rocking lever 35 onto the broaching carriage 17 is realized by means of the truncated cone structure 72.

At the forward end of the rocking lever 35 in FIG. 3, an insert 77 is screwed in that is provided with a slantedly positioned slotted hole 79 (see angle β). The slotted hole 79 is seated on a transverse bolt 81 which is secured on the broaching carriage 17. When the push and pull rod 53 now moves the rocking lever 35 in FIG. 3 to the left relative to the broaching carriage 17, the rocking lever 35 is not only lifted off the truncated cone structure 72 but also, due to the slantedly positioned slotted hole 79, is moved downward in FIG. 3. Accordingly, the cutter 83 of the tool support 11 is lifted off the base of the keyway and the return stroke can be carried out. As soon as the sliding block 41 and together with it the push and pull rod 53 is moved again to the right relative to the broaching carriage 17, the rocking lever 35 is again pulled against the truncated cone structure 72 and at the same time the cutter 83 is moved upwardly again.

A transverse bolt 71 of the push and pull rod 53 engages a transverse bore 75 of the rocking lever 35 and transmits the relative movement between sliding block 41 and broaching carriage 17 onto the rocking lever 35.

FIG. 4.1 shows in an exploded view a fourth embodiment of the device according to the invention.

The rocking lever 35 is illustrated more clearly in the detail illustration Z of FIG. 4.1. It is apparent that in the first embodiment a truncated cone-shaped section 51 is present. This truncated cone shaped section 51 interacts with two pawls 85 of the push and pull rod 53 (see detail X of FIG. 4.1). When the push and pull rod 53 and together with it the pawls 85 are moved relative to the rocking lever 35 to the right in FIG. 4.2, the pawls 85 rotate the rocking lever 35 about pin 37. Accordingly, the rocking lever 35 is moved into a first angular position during the working stroke or is secured in this angular position.

In order for the rocking lever 35 to assume the second angular position during the return stroke, a reversing element 87 is supported by means of pin 89 rotatably in a semi-round depression 90 of the push and pull rod 53. The reversing element 87 has at least one, preferably two, pawls 91 that also interact with the slant or the truncated cone-shaped section 51 of the rocking lever 35. In FIG. 4.1 the slotted hole 21 in the broaching carriage 17 is shown.

When the push and pull rod 35 is now moved relative to the rocking lever 35 to the left in FIG. 4.2, the pawls 89 of the reversing element 87 push the rocking lever 35 into the second angular position.

In this embodiment, the rocking lever 35 is supported by means of a spherical cup 73 in the broaching carriage 17. The spherical cup 73 transmit the cutting and transverse forces while the pin 37 ensures that the rocking lever 35 has a defined point of rotation when changing between first and second angular positions. In order to avoid static redundancy, the geometries and tolerances must be matched in a suitable way to each other or a spring, not illustrated in detail, ensures tolerance compensation.

FIGS. 4.2 to 4.4 show different views of the fourth embodiment.

In FIG. 4.4 a variant of the control of the sliding block 41 is illustrated in which the eccentric bolt 31 is interacting without play or with minimal play with the guide 43 in the meaning of a forced control action. For this purpose, on both sides of the guide 43 control sections 46.1, 46.2, 49.1, and 49.2 are formed. Due to the forced control action, the laminated disk springs 45 can be eliminated.

The specification incorporates by reference the entire disclosure of German priority document 10 2013 218 507.3 having a filing date of Sep. 16, 2013.

While specific embodiments of the invention have been shown and described in detail to illustrate the inventive principles, it will be understood that the invention may be embodied otherwise without departing from such principles.

What is claimed is:

1. A device for keyway broaching, comprising:
   a housing;
   a drive shaft;
   a broaching carriage received and supported in the housing;
   a tool support connected to the broaching carriage;
   a crank drive that operatively couples the drive shaft and the broaching carriage with each other, wherein the broaching carriage, when driven by the drive shaft, performs an oscillating movement comprising a cutting movement and a return stroke;
   a sleeve arranged between the housing and the broaching carriage;
   a first seal provided between the housing and the sleeve and/or between the sleeve and the broaching carriage.

2. The device according to claim 1, wherein the sleeve is fixedly and seal-tightly connected to the broaching carriage and the first seal is provided between the housing and the sleeve.

3. The device according to claim 2, wherein the sleeve has an interior and in the interior of the sleeve a second seal is provided, wherein the second seal seals a gap between the tool support or a component connected to the tool support.

4. The device according to claim 1, wherein the first seal enables a relative movement between the housing and the sleeve and/or the sleeve and the broaching carriage in a direction orthogonal to a cutting movement of the broaching carriage.

5. The device according to claim 1, wherein the housing comprises an opening, wherein the first seal is arranged in the vicinity of the opening and wherein the sleeve projects past the seal in axial direction away from the housing.

6. The device according to claim 1, wherein the first seal is a sealing ring of rubber or plastic material.

7. The device according to claim 1, further comprising a sliding block that is arranged in a recess of the broaching carriage, wherein the sliding block comprises a guide embodied as a control curve and further comprises a push and pull rod engaging a rocking lever that is attached to the tool support, wherein the crank drive comprises an eccentric bolt engaging the guide, wherein the eccentric bolt moves the push and pull rod relative to the broaching carriage.

8. The device according to claim 7, wherein the eccentric bolt is engaged with play or with minimal play in the guide.

9. The device according to claim 7, wherein the sliding block is pulled by a spring action against the broaching carriage.

10. The device according to claim 1, wherein the crank drive comprises an eccentric member formed on the drive shaft and wherein the broaching carriage comprises a slotted hole as a part of the crank drive, wherein the eccentric member engages the slotted hole.

11. The device according to claim 1, wherein the crank drive comprises a lifting pin provided on the drive shaft and a connecting rod connected to the broaching carriage.

12. The device according to claim 1, comprising a rocking lever arranged in a longitudinal bore of the broaching carriage.

13. The device according to claim 12, further comprising a sliding block arranged in the broaching carriage and a push and pull rod connected to the sliding block, wherein the push and pull rod controls and moves the rocking lever from a first angular position into a second angular position and from the second angular position into the first angular position.

14. The device according to claim 13, wherein the rocking lever has a first end which is facing the push and pull rod, wherein the first end of the rocking lever comprises a wedge-shaped or truncated cone-shaped rocking lever section, wherein the push and pull rod comprises a first end which is facing the rocking lever, wherein the first end of the push and pull rod comprises at least one finger, wherein the at least one finger interacts with the rocking lever section in such a way that, when a pulling load is acting on the push and pull rod, the at least one finger moves radially outwardly and is supported in a longitudinal bore of the broaching carriage.

15. The device according to claim 14, wherein several of said at least one finger are distributed circumferentially about the first end of the push and pull rod and are bending-elastic.

16. The device according to claim 13, wherein the push and pull rod comprises at least one plunger oriented approximately parallel to a movement direction of the broaching carriage, wherein on a second end of the rocking lever that is facing away from the push and pull rod at least one stop is arranged.

17. The device according to claim 13, wherein the rocking lever comprises a first end which is facing the push and pull rod, wherein the first end of the rocking lever comprises a wedge-shaped or truncated cone-shaped rocking lever section, wherein the push and pull rod has a first end that is facing the rocking lever, wherein the first end of the push and pull rod comprises at least one pawl that interacts with the rocking lever section in such a way that, when a pulling load is acting on the push and pull rod, the first end of the rocking lever is pivoted orthogonally to a direction of the oscillating movement of the broaching carriage.

18. The device according to claim 17, further comprising a reversing element rotatably supported on the push and pull rod, the reversing element comprising at least one second pawl that is positioned opposite the at least one first pawl of the push and pull rod, and wherein the at least one second pawl of the push and pull rod engages the rocking lever section.

19. The device according to claim 18, wherein the rocking lever section is spring-loaded against the at least one first pawl and the at least one second pawl.

20. The device according to claim 13, wherein the rocking lever comprises a first end provided with a slotted hole, wherein the first end is facing the push and pull rod, wherein the slotted hole has a longitudinal axis that is positioned relative to a direction of the oscillating movement of the rocking lever at an angle that is greater than 0° and wherein the push and pull rod comprises a bolt that engages the slotted hole.

21. The device according to claim 20, wherein the rocking lever comprises a second end facing away from the push and pull rod, wherein the second end has a transverse bore and wherein the broaching carriage comprises a pin engaging the transverse bore.

22. The device according to 13, wherein the rocking lever comprises a first end provided with a slotted hole, wherein the first end is facing the push and pull rod, wherein the slotted hole has a longitudinal axis that is positioned relative to a direction of the oscillating movement of the rocking lever at an angle that is greater than 0° and wherein the broaching carriage comprises a bolt that engages the slotted hole.

23. The device according to claim 22, comprising a separate insert in which the slotted hole is formed, wherein the separate insert is adapted to be connected in two positions to the rocking lever.

24. The device according to claim 12, wherein the broaching carriage comprises a truncated cone structure or a spherical cup formed at an end of the broaching carriage facing an opening of the housing, wherein on the rocking lever a counter surface complementary to the truncated cone structure or the spherical cup is formed, wherein the truncated cone structure or the spherical cup and the counter surface form a bearing for the rocking lever, respectively.

25. The device according to claim 13, comprising at least one spring element arranged in the housing, wherein the at least one spring element exerts a spring force onto the sliding block and the push and pull rod so as to pull the sliding block and the push and pull rod away from the rocking lever.

26. The device according to claim 25, wherein the spring force acting on the sliding block and the push and pull rod is oppositely oriented to a control movement exerted onto the sliding block by an eccentric bolt of the crank drive.

27. The device according to claim 1, comprising a cover attached to the housing.

28. A device for keyway broaching, comprising:
a housing comprising a linear guide;
a drive shaft;
a broaching carriage received in the housing and guided on the linear guide;
a crank drive that couples the drive shaft and the broaching carriage with each other;
a tool support;
a rocking lever, wherein the tool support is connected to the broaching carriage with the rocking lever interposed between the tool support and the broaching carriage;
wherein the drive shaft comprises a control section that controls a relative movement between the rocking lever and the broaching carriage.

29. The device according to claim 28, further comprising a sliding block arranged in the broaching carriage, wherein the control section is embodied as an eccentric bolt and wherein the eccentric bolt interacts with the sliding block.

30. The device according to claim 29, wherein the crank drive comprises an eccentric member engaging the broaching carriage and wherein the eccentric bolt and the eccentric member together form a monolithic component or are embodied as a stepped bolt.

31. The device according to claim 29, wherein in the broaching carriage a recess is formed and the sliding block is received in the recess and guided in the recess in a direction of oscillating movement of the broaching carriage.

32. The device according to claim 31, wherein the sliding block comprises a guide embodied as a control curve and further comprises a push and pull rod engaging the rocking lever, wherein the crank drive comprises an eccentric bolt engaging the guide, wherein the eccentric bolt moves the push and pull rod relative to the broaching carriage.

33. The device according to claim 32, wherein the eccentric bolt engages with play or with minimal play the guide.

34. The device according to claim 32, wherein the sliding block is pulled by a spring action against the broaching carriage.

35. The device according to claim 28, wherein the crank drive comprises an eccentric member formed on the drive shaft and wherein the broaching carriage comprises a slotted hole as a part of the crank drive, wherein the eccentric member engages the slotted hole.

36. The device according to claim 28, wherein the crank drive comprises a lifting pin provided on the drive shaft and a connecting rod connected to the broaching carriage.

37. The device according to claim 28, wherein the rocking lever is received in a longitudinal bore of the broaching carriage.

38. The device according to claim 28, further comprising a sliding block arranged in the broaching carriage and a push and pull rod connected to the sliding block, wherein the push and pull rod controls and moves the rocking lever from a first angular position into a second angular position and from the second angular position into the first angular position.

39. The device according to claim 38, wherein the rocking lever has a first end which is facing the push and pull rod, wherein the first end of the rocking lever comprises a wedge-shaped or truncated cone-shaped rocking lever section, wherein the push and pull rod comprises a first end which is facing the rocking lever, wherein the first end of the push and pull rod comprises at least one finger, wherein the at least one finger interacts with the rocking lever section in such a way that, when a pulling load is acting on the push and pull rod, the at least one finger moves radially outwardly and is supported in a longitudinal bore of the broaching carriage.

40. The device according to claim 39, wherein several of said at least one finger are distributed circumferentially about the first end of the push and pull rod and are bending-elastic.

41. The device according to claim 40, wherein the push and pull rod comprises at least one plunger oriented approximately parallel to a movement direction of the broaching carriage, wherein on a second end of the rocking lever that is facing away from the push and pull rod at least one stop is arranged.

42. The device according to claim 38, wherein the rocking lever comprises a first end which is facing the push and pull rod, wherein the first end of the rocking lever comprises a wedge-shaped or truncated cone-shaped rocking lever section, wherein the push and pull rod has a first end that is facing the rocking lever, wherein the first end of the push and pull rod comprises at least one first pawl that interacts with the rocking lever section in such a way that, when a pulling load is acting on the push and pull rod, the first end of the rocking lever is pivoted orthogonally to a direction of the oscillating movement of the broaching carriage.

43. The device according to claim 42, further comprising a reversing element rotatably supported on the push and pull rod, the reversing element comprising at least one second pawl that is positioned opposite the at least one first pawl of the push and pull rod, and wherein the at least one second pawl of the push and pull rod engages the rocking lever section.

44. The device according to claim 43, wherein the rocking lever section is spring-loaded against the at least one first pawl and the at least one second pawl.

45. The device according to 38, wherein the rocking lever comprises a first end provided with a slotted hole, wherein the first end is facing the push and pull rod, wherein the slotted hole has a longitudinal axis that is positioned relative to a direction of the oscillating movement of the rocking lever at an angle that is greater than 0° and wherein the push and pull rod comprises a bolt that engages the slotted hole.

46. The device according to claim 45, wherein the rocking lever comprises a second end facing away from the push and pull rod, wherein the second end has a transverse bore and wherein the broaching carriage comprises a pin engaging the transverse bore.

47. The device according to 38, wherein the rocking lever comprises a first end provided with a slotted hole, wherein the first end is facing the push and pull rod, wherein the slotted hole has a longitudinal axis that is positioned relative to a direction of the oscillating movement of the rocking lever at an angle that is greater than 0° and wherein the broaching carriage comprises a bolt that engages the slotted hole.

48. The device according to claim 47, comprising a separate insert in which the slotted hole is formed, wherein the separate insert is adapted to be connected in two positions to the rocking lever.

49. The device according to claim 28, wherein the broaching carriage comprises a truncated cone structure or a spherical cup formed at an end of the broaching carriage facing an opening of the housing, wherein on the rocking lever a counter surface complementary to the truncated cone structure or the spherical cup is formed, wherein the truncated cone structure or the spherical cup and the counter surface form a bearing for the rocking lever, respectively.

50. The device according to claim 38, comprising at least one spring element arranged in the housing, wherein the at least one spring element exerts a spring force onto the sliding block and the push and pull rod so as to pull the sliding block and the push and pull rod away from the rocking lever.

51. The device according to claim 50, wherein the control section of the drive shaft is embodied as an eccentric bolt and wherein the eccentric bolt interacts with the sliding block, wherein the spring force acting on the sliding block and the push and pull rod is oppositely oriented to a control movement exerted by the eccentric bolt onto the sliding block.

52. The device according to claim 28, comprising a cover attached to the housing.

* * * * *